Sept. 12, 1933.  W. A. TUTTLE ET AL  1,926,126
LINK BELT
Filed April 13, 1932  3 Sheets-Sheet 1

INVENTORS:
Wayland A. Tuttle and
Philip W. White,
BY Redding, Greeley, O'Shea & Campbell
Their ATTORNEYS Sept. 12, 1933. W. A. TUTTLE ET AL 1,926,126
LINK BELT
Filed April 13, 1932 3 Sheets-Sheet 2

INVENTORS:
Wayland A. Tuttle and
Philip W. White,
BY Redding, Greeley, O'Shea & Campbell
Their ATTORNEYS Sept. 12, 1933.  W. A. TUTTLE ET AL  1,926,126
LINK BELT
Filed April 13, 1932    3 Sheets-Sheet 3

INVENTORS:
Wayland A. Tuttle and
Philip W. White
BY Redding, Greeley, O'Shea + Campbell
Their ATTORNEYS Patented Sept. 12, 1933

1,926,126

UNITED STATES PATENT OFFICE 1,926,126

LINK BELT

Wayland A. Tuttle, West Boylston, and Philip W. White, Clinton, Mass., assignors to Edward C. Bowers and Charles L. Feldman, receivers for Wickwire Spencer Steel Company, New York, N. Y., a corporation of Delaware Application April 13, 1932. Serial No. 604,922

2 Claims. (Cl. 198—193)

The present invention relates to conveyor belts and embodies, more specifically, a conveyor belt of the endless type wherein the belt is adapted to be driven positively by a sprocket or other element which engages the belt directly.

In existing forms of endless belts wherein a friction drive is provided to impart a desired motion to the belt, slippage of the belt on the belt drums frequently occurs and it has been necessary to apply added tension to the belt, particularly where heavy loads and materials are supported upon the belt in passing through a furnace. The necessity of maintaining such tension obviously is a serious disadvantage in existing structures and the present invention has been designed to provide a belt structure which is adapted to be driven directly by a sprocket or other wheel which engages elements of the belt to move the same positively in a desired fashion. In addition to affording a positive drive, the mechanism maintains a desired alignment of the belt and definitely controls the festooning thereof between supporting members.

An object of the invention, accordingly, is to provide a belt which is adapted to support articles in a desired fashion and to be driven positively by a suitable driving mechanism.

A further object of the invention is to provide a belt construction formed of links which are adapted to be engaged positively by a driving sprocket or gear.

A further object of the invention is to provide an endless belt construction wherein flat links are incorporated as elements of the belt, the links being so connected that they are offset laterally in order that the teeth of the driving sprockets which are adapted to engage such links may be offset in corresponding fashion to afford a more uniform source of power.

A further object of the invention is to provide an endless belt construction wherein spaced links are provided to form a grating or apertured belt construction, such links cooperating with flat links, the ends of which are curved and adapted to be engaged by the teeth of suitable driving sprockets.

Further objects, not specifically enumerated above, will be apparent as the invention is described in greater detail in connection with the accompanying drawings, wherein.

Figure 5:
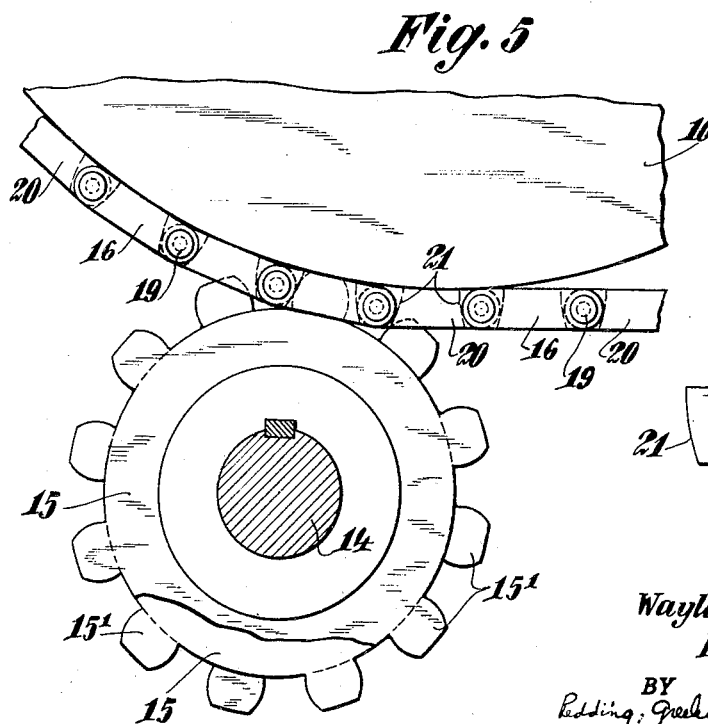
Figure 5 is an enlarged segmental view in end elevation showing the supporting drum driving sprocket and belt constructed in accordance with the present invention.
Figure 6:
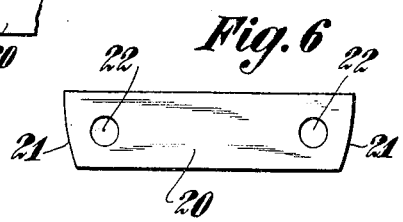
Figure 6 is a detailed view showing a flat link which is adapted to form a portion of a belt constructed in accordance with the present invention.

Referring to the above drawings, a smooth drum over which a belt is adapted to be mounted is indicated at 10. The drum is mounted upon a shaft 11 which is journaled at 12 upon standards 13. The standards may also mount a driving shaft 14 upon which a plurality of sprocket gears 15 are secured, these gears affording means for driving the belt sprocket in accordance with the present invention. The sprocket gears 15 are provided with teeth 15′ which are offset laterally on the respective gears, as seen in Figure 5.

The belt which is constructed in accordance with the present invention is formed of a plurality of flat links 20 and a plurality of connecting links 16. Between the links 16, spacing rollers 17 are provided. Through the rollers, links 20 and link 16, apertures are formed to receive pins 19 when the belt is assembled. In assembling the belt a plurality of series of links 16 are provided, each of the links of each series having the adjacent ends thereof interengaged in such manner that the pins 19 pass through the apertures formed in the sides of the links. Between each series, pairs of flat links 20 are mounted, the flat links spacing the parallel series of links 16 and serving as a means for receiving the driving forces from the driving sprockets 15.

Figure 1:
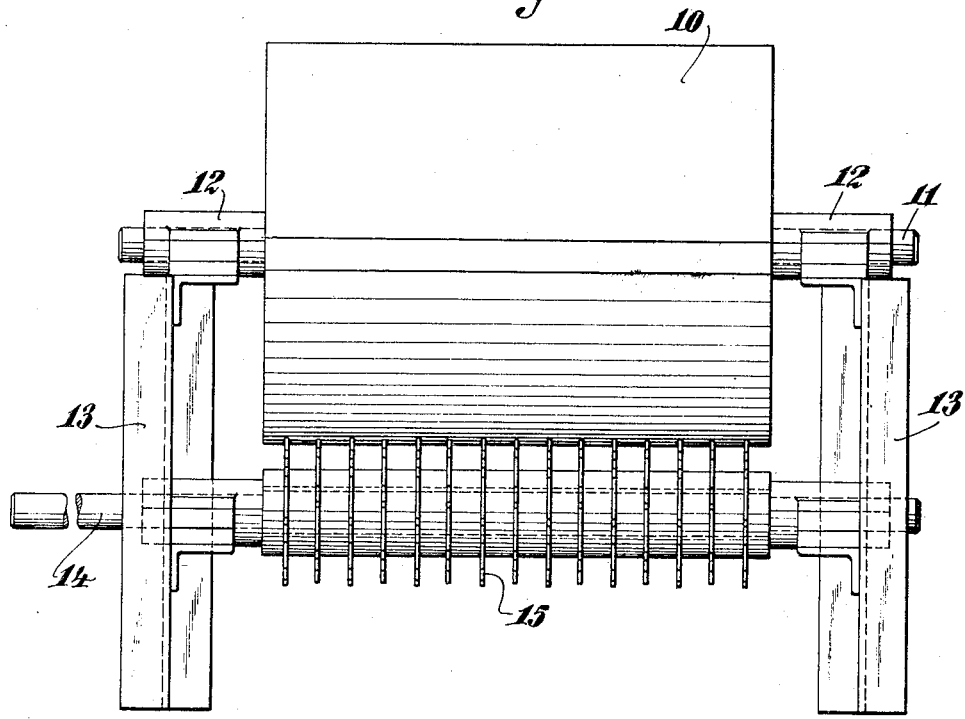
Figure 1 is a view in end elevation showing a supporting drum and driving sprocket with which a belt constructed in accordance with the present invention cooperates.
Figure 2:
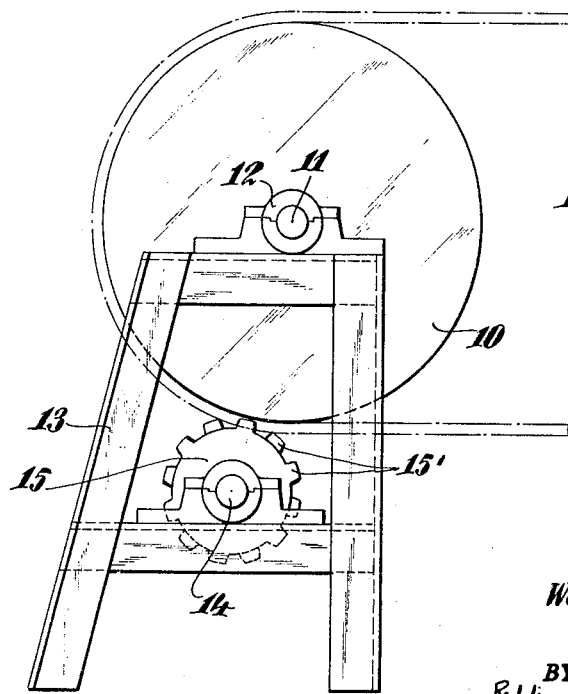
Figure 2 is a view in end elevation showing the mechanism of Figure 1, a belt being indicated in driving relation by dot and dash lines.
Figure 3:
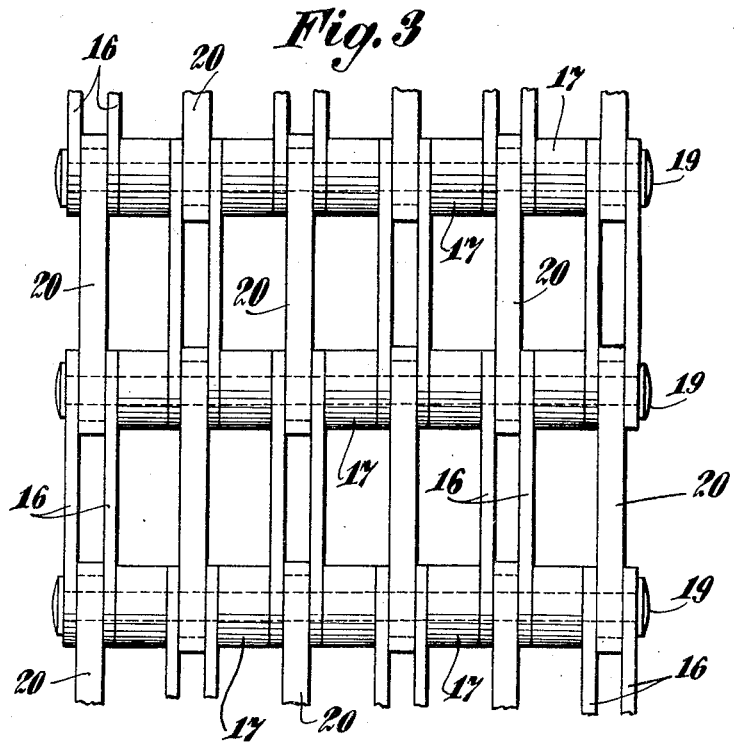
Fig. 3 is a plan view of a belt constructed in accordance with the present invention.
Figure 4:
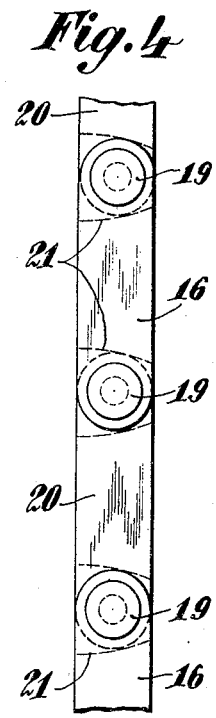
Figure 4 is a view in end elevation showing the belt of Figure 3.

The ends of the flat links 20 are curved as indicated at 21 and provided with apertures 22 to receive the pins 19. As seen in Figures 4 and 5, the curved extremities of flat links 20 are adapted to be engaged by the teeth 15′ of the sprocket gears 15 and thus driving forces are effectively transmitted from the driving sprocket to the belt.

Figure 7:
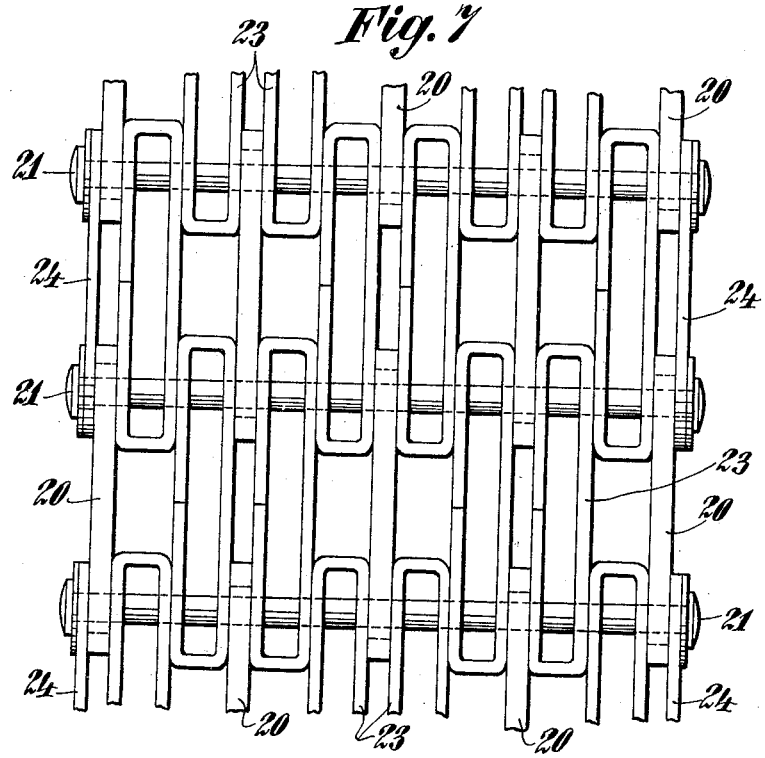
Figure 7 is a plan view showing a modified form of belt constructed in accordance with the present invention.
Figure 8:
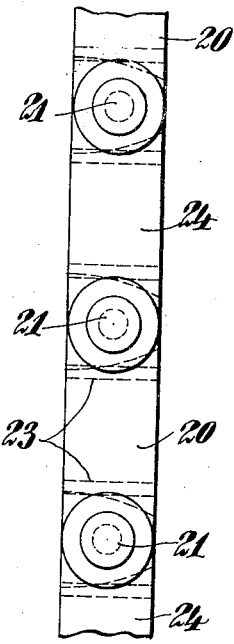
Figure 8 is a view in end elevation showing the belt of Figure 7.

In the belt construction shown in Figures 7 and 8, the flat links 20, formed with curved ends as described in connection with the corresponding links shown in Figures 1 through 6 are spaced in staggered relationship and hinged to the pins 21. Between the adjacent ends of the flat links rectangular spacing links 23 are provided. In the construction shown in Figures 7 and 8, two spacing links are positioned between the adjacent ends of the staggered links 20, these spacing links being hinged upon the pins 21 which pass through the opposite sides of each link. The links 23 may be formed from a single piece of metal which is bent and welded into a rectangular form, the links being drilled properly to receive the pins 21. Outer flat links 24 may be provided to be positioned over the ends of the pins 21 to maintain the links 20 and 23 in assembled relationship.

Figure 9:
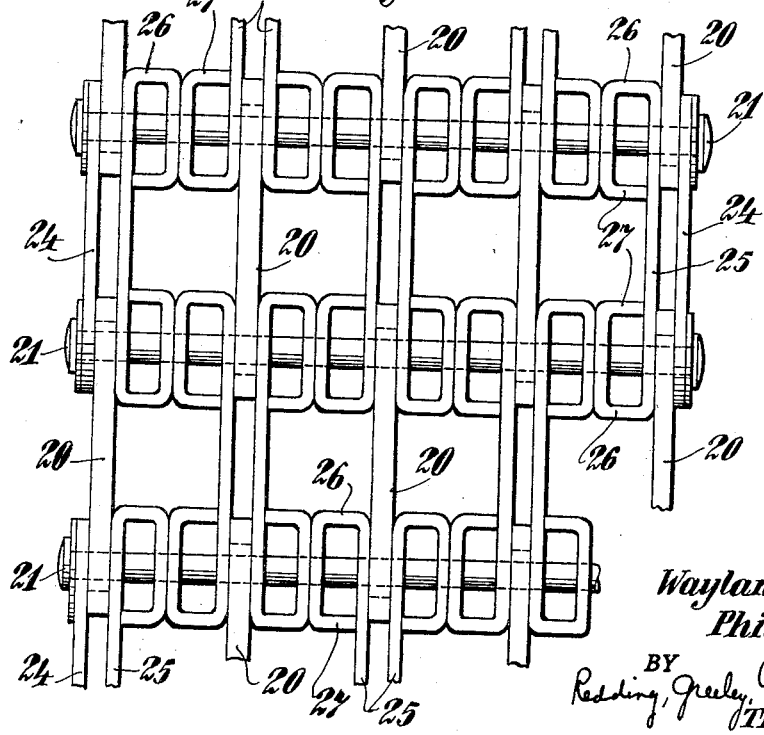
Figure 9 is a plan view showing a further modified form of belt constructed in accordance with the present invention.

In the construction shown in Figure 9, the flat links 20 are correctly positioned by means of spacing links 25 which are formed with loops at either end thereof to afford the desired spacing. The loops are shown at 26 and the ends of the links 25 which are turned back, abut with the flat portions of the respective links at right angles to the plane thereof, as seen at 27 in Figure 9. The rectangular loops formed at the ends of each of the spacing links 25 are drilled to receive the pins 21 and, in the form shown in Figure 9, two spacing links are pivoted between the adjacent ends of staggered flat links 20.

The foregoing construction provides a driving means for endless belts whereby the belts are driven positively and thus slippage thereof is entirely eliminated. Lateral creeping of the belt is likewise eliminated and the operation of the belt is consequently accurately controlled.

While the invention has been described with specific reference to the accompanying drawings, it is not to be limited, save as defined in the appended claims.

We claim as our invention:

1. An endless belt comprising a plurality of laterally disposed connecting and spacing links, said links forming hollow rectangular spacing members, links between the connecting links, means to hinge the links together, and means formed on the last named links to be engaged by a driving means.

2. An endless belt comprising a plurality of laterally disposed connecting and spacing links, said links being formed with flat portions having end loops formed as hollow rectangular spacing members, links between the connecting links, means to hinge the links together, and means formed on the last named links to be engaged by a driving means.

WAYLAND A. TUTTLE.
PHILIP W. WHITE.